(12) United States Patent
Horii et al.

(10) Patent No.: US 10,876,492 B2
(45) Date of Patent: Dec. 29, 2020

(54) DEVICE FOR CONTROLLING FUEL INJECTION DEVICE

(71) Applicant: Hitachi Automotive Systems, Ltd., Hitachinaka (JP)

(72) Inventors: Tomoaki Horii, Hitachinaka (JP); Tei Ho, Hitachinaka (JP); Kazuya Saito, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 109 days.

(21) Appl. No.: 16/312,352

(22) PCT Filed: Jun. 12, 2017

(86) PCT No.: PCT/JP2017/021572
§ 371 (c)(1),
(2) Date: Dec. 21, 2018

(87) PCT Pub. No.: WO2018/012166
PCT Pub. Date: Jan. 18, 2018

(65) Prior Publication Data
US 2020/0182186 A1    Jun. 11, 2020

(30) Foreign Application Priority Data
Jul. 12, 2016  (JP) .................... 2016-137920

(51) Int. Cl.
*F02D 41/04*  (2006.01)
*F02D 41/34*  (2006.01)
(Continued)

(52) U.S. Cl.
CPC .......... *F02D 41/402* (2013.01); *F02D 41/34* (2013.01); *F02B 2075/125* (2013.01);
(Continued)

(58) Field of Classification Search
CPC ........ F02D 41/04; F02D 41/34; F02D 41/047; F02D 41/402; F02D 41/3094;
(Continued)

(56) References Cited

U.S. PATENT DOCUMENTS

| 4,789,004 A | 12/1988 | McCracken |
| 6,073,606 A * | 6/2000 | Shimizu ............... F02D 41/3064 |
| | | 123/295 |
| 2003/0062028 A1 | 4/2003 | Kitagawa et al. |

FOREIGN PATENT DOCUMENTS

| JP | 2000-257476 A | 9/2000 |
| JP | 2001-123925 A | 5/2001 |

(Continued)

OTHER PUBLICATIONS

International Search Report (PCT/ISA/210) issued in PCT Application No. PCT/JP2017/021572 dated Aug. 15, 2017 with English translation (six pages).

(Continued)

*Primary Examiner* — Phutthiwat Wongwian
*Assistant Examiner* — Arnold Castro
(74) *Attorney, Agent, or Firm* — Crowell & Moring LLP

(57) ABSTRACT

Provided is a device for controlling a fuel injection device capable of suppressing deterioration of exhaust performance while ensuring driving performance when acceleration of a vehicle is requested during an intake stroke. Therefore, when the acceleration of a vehicle is requested during an intake stroke in one combustion cycle, an engine control unit 9 estimates an increase (acceleration intake air amount Qad) of the amount of air taken in a combustion chamber 19 of an internal combustion engine 1 associated with the acceleration of the vehicle after the acceleration of the vehicle is requested in one combustion cycle based on a lift amount of an intake valve 3. The engine control unit 9 controls a fuel (Continued)

injection valve 5 so as to increase a fuel injection amount in one combustion cycle according to the acceleration intake air amount Qad.

7 Claims, 8 Drawing Sheets

(51) Int. Cl.
*F02D 41/40* (2006.01)
*F02B 75/12* (2006.01)
*F02D 41/30* (2006.01)
*F02D 45/00* (2006.01)
*F02D 41/00* (2006.01)
*F02D 41/20* (2006.01)
*F02D 41/38* (2006.01)

(52) U.S. Cl.
CPC ........ *F02D 41/047* (2013.01); *F02D 41/3094* (2013.01); *F02D 45/00* (2013.01); *F02D 2041/001* (2013.01); *F02D 2041/2055* (2013.01); *F02D 2041/389* (2013.01); *F02D 2200/0404* (2013.01); *F02D 2200/0614* (2013.01)

(58) Field of Classification Search
CPC ............... F02D 45/00; F02D 2041/001; F02D 2041/389; F02D 2041/2055; F02D 2200/0404; F02D 2200/0614; F02B 2075/125; Y02T 10/44
See application file for complete search history.

(56) References Cited

FOREIGN PATENT DOCUMENTS

| | | |
|---|---|---|
| JP | 2003-106203 A | 4/2003 |
| JP | 2004-60568 A | 2/2004 |
| JP | 2004-108259 A | 4/2004 |
| JP | 2008-196384 A | 8/2008 |
| JP | 2014-218987 A | 11/2014 |
| WO | WO 2014/115510 A1 | 7/2014 |

OTHER PUBLICATIONS

Japanese-language Written Opinion (PCT/ISA/237) issued in PCT Application No. PCT/JP2017/021572 dated Aug. 15, 2017 (four pages).

* cited by examiner

DEVICE FOR CONTROLLING FUEL INJECTION DEVICE

TECHNICAL FIELD

The present invention relates to a device for controlling a fuel injection device.

BACKGROUND ART

In a cylinder injection type internal combustion engine capable of directly injecting fuel into a cylinder of an internal combustion engine, it is possible to inject fuel in a wide range from an intake stroke to a compression stroke, and a fuel injection amount of the cylinder injection type internal combustion engine is calculated based on an intake air amount detected by an air flow meter (AFM: Air Flow Meter) at the start of the intake stroke.

However, if the intake air amount during the intake stroke increases at the time of acceleration and the like after measurement of the intake air amount by the air flow meter (AFM), an air-fuel ratio becomes lean, and it is considered that exhaust performance and driving performance are affected.

As a solution to this problem, it is disclosed that a fuel injection amount is calculated based on an operation state of an internal combustion engine, the calculated injection amount of fuel is injected into a combustion chamber during an intake stroke, separately from this fuel injection amount, at the end timing of the intake stroke, the amount of air taken in the combustion chamber of the internal combustion engine is measured, a fuel correction amount is calculated based on the measured intake air amount, and the calculated correction fuel is additionally injected into the combustion chamber from the end timing of the intake stroke (for example, refer to PTL 1). In this technique, insufficient fuel is additionally injected into the combustion chamber from the end timing of the intake stroke.

CITATION LIST

Patent Literature

PTL 1: JP 2000-257476 A

SUMMARY OF INVENTION

Technical Problem

According to the technique disclosed in PTL 1, the amount of air increased associated with acceleration or the like during an intake stroke after measurement of an intake air amount is detected until the end timing of the intake stroke, and the shortage of fuel is injected from the end timing of the intake stroke. Therefore, the shortage of the fuel injection amount can be accurately calculated. However, since the calculation timing of the shortage of the fuel injection amount is delayed, depending on the calculated fuel injection amount and an engine rotation speed, the fuel is injected during a compression stroke, and due to fuel adhesion to a piston crown surface and a wall surface of a combustion chamber, exhaust performance may be deteriorated.

Further, in the method in which the fuel injection is performed a plurality of times in one cycle in the intake stroke and the compression stroke as in multistage injection control, the injection timing of the basic fuel injection amount is set. Therefore, the shortage of fuel increased during the intake stroke associated with acceleration and the like cannot be injected from the end timing of the intake stroke but is injected during the compression stroke. Therefore, there is a possibility that the exhaust performance further deteriorates.

An object of the present invention is to provide a device for controlling a fuel injection device capable of suppressing deterioration of the exhaust performance while ensuring the driving performance when acceleration of a vehicle is requested in the intake stroke.

Solution to Problem

To achieve the above-described object, the present invention provides a device for controlling a fuel injection device, including an estimation unit and a control unit. When acceleration of a vehicle is requested during an intake stroke in one combustion cycle, based on a lift amount of an intake valve, the estimation unit estimates an increase in the amount of air taken in a combustion chamber of an internal combustion engine associated with the acceleration of the vehicle after the acceleration of the vehicle is requested in the one combustion cycle. The control unit controls the fuel injection device so as to increase a fuel injection amount in the one combustion cycle according to the increase in the air amount estimated in the estimation unit.

Advantageous Effects of Invention

According to the present invention, when acceleration of a vehicle is requested in an intake stroke, it is possible to suppress deterioration of exhaust performance while ensuring driving performance. Issues, configurations, and effects other than the above are clarified by descriptions of the following embodiments.

DESCRIPTION OF EMBODIMENTS

Hereinafter, the configuration and operation of an engine control unit 9, which is a device for controlling a fuel injection device according to an embodiment of the present invention, will be described with reference to the drawings.

(Basic Configuration)

Figure 1:
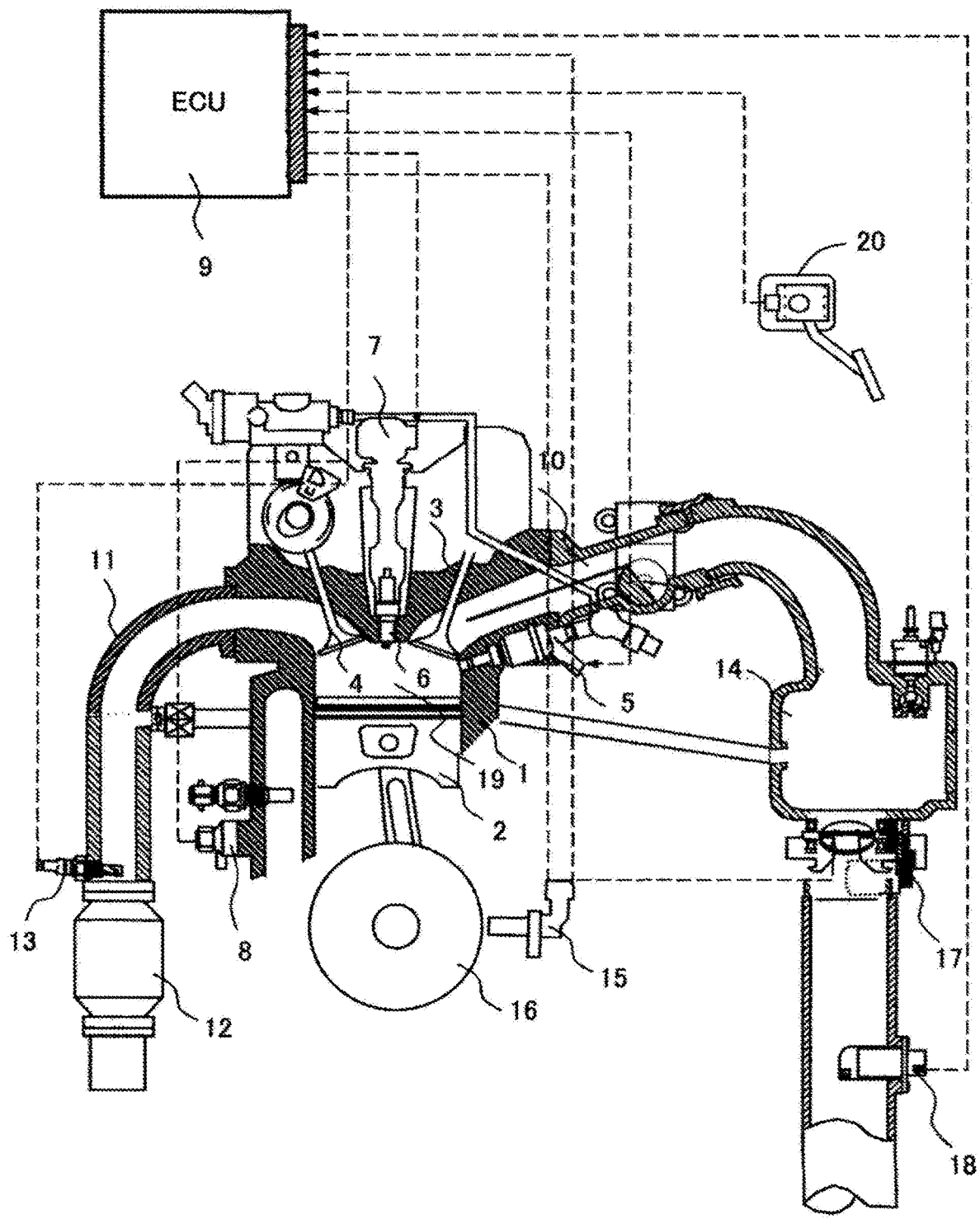
FIG. 1 is a schematic diagram of a spark ignition internal combustion engine and a control device according to an embodiment of the present invention.

FIG. 1 is a basic configuration diagram of an internal combustion engine 1 and its control device according to an embodiment of the present invention. A cylinder injection type internal combustion engine is exemplified in the following description, but a port injection type internal combustion engine and a dual injection type internal combustion engine having both in-cylinder injection and port injection are also applicable.

In FIG. 1, the internal combustion engine 1 is provided with a piston 2, an intake valve 3, and an exhaust valve 4. Intake air passes through an intake air flow meter 18 (AFM), enters a throttle valve 17, and is supplied to a combustion chamber 19 of the internal combustion engine 1 from a branch intake manifold 14 via an intake pipe 10 and an intake valve 3. Fuel is injected and supplied to the combustion chamber 19 of the internal combustion engine 1 from a fuel injection valve 5 (fuel injection device) and ignited by an ignition coil 7 and an ignition plug 6. Exhaust gas after combustion is discharged to an exhaust pipe 11 via an exhaust valve 4, and a three-way catalyst 12 for purifying exhaust gas is provided in the exhaust pipe 11.

A signal from a crank angle sensor 15 of the internal combustion engine 1, an air amount signal from the intake air flow meter 18 (AFM), a signal from an air/fuel ratio sensor 13 for detecting an air/fuel ratio in exhaust gas, a signal of an accelerator opening or the like from an accelerator opening sensor 20 are input to the engine control unit 9. The engine control unit 9 calculates a required torque from the accelerator opening sensor 20 to the internal combustion engine, determines an idling state, calculates an intake air amount necessary for the internal combustion engine 1, and outputs an opening signal corresponding thereto to the throttle valve 17. A fuel injection signal is output to the fuel injection valve 5, and an ignition signal is output to the ignition plug 6.

Figure 2:
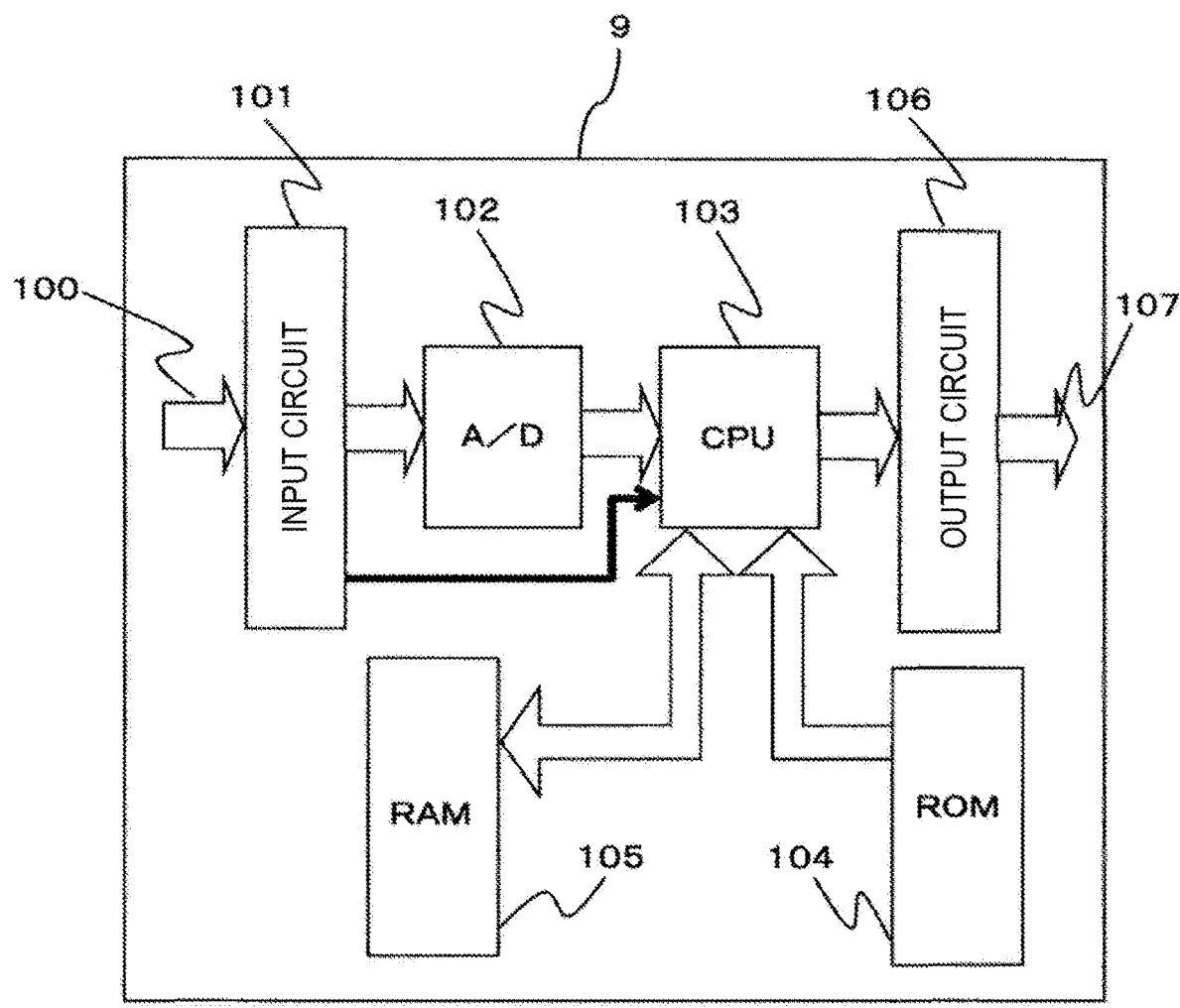
FIG. 2 is an internal configuration diagram of a control unit.

FIG. 2 illustrates the internal configuration of the engine control unit 9.

The engine control unit 9 includes a microcomputer incorporating an input circuit 101, an A/D conversion unit 102, a central processing unit 103, a ROM 104 (Read Only Memory), a RAM 105 (Random Access Memory), and an output circuit 106. When an input signal 100 is an analog signal (for example, a signal from the intake air flow meter 18 (AFM), the accelerator opening sensor 20, etc.), the input circuit 101 removes a noise component from the signal and outputs the signal to the A/D conversion unit 102.

The central processing unit 103 has a function of acquiring an A/D conversion result and executing a fuel injection control program and the other control program stored in a medium such as the ROM 104 to perform each control and diagnosis. A calculation result and the A/D conversion result are temporarily stored in the RAM 105, and the calculation result is output as a control signal 107 through an output circuit 106 and used for controlling the fuel injection valve 5, the ignition coil 7, etc.

Comparative Example

Next, an air amount transition during an intake stroke by predetermined acceleration determination will be described with reference to FIG. 3. In the case of intake stroke injection, in fuel injection control, a fuel injection amount is calculated based on an engine speed of an internal combustion engine and an intake air amount detected by the intake air flow meter 18 (AFM) at the start of an intake stroke.

In the case of multistage injection in which fuel injection is performed a plurality of times during one cycle from the start of an intake stroke to the end of a compression stroke, it is considered that the fuel injection amount is calculated based on an engine speed of the internal combustion engine and the intake air amount detected by the intake air flow meter 18 (AFM) at the start of the intake stroke, and the fuel injection amount is corrected based on the latest information at the start of the compression stroke.

In this case, the intake air amount which is the basis of the fuel injection amount calculation is the intake air amount detected by the intake air flow meter 18 (AFM) at the start of the intake stroke and a value detected before point A at which the intake valve 3 starts to open. In the case where acceleration is not determined (when it is determined that acceleration of a vehicle is not requested), an intake air amount per unit time is substantially constant, the integrated amount of air taken in a combustion chamber of an internal combustion engine in one cycle has a behavior like the behavior before acceleration of FIG. 3, and the integrated air amount at point C at which the intake valve 3 closes becomes a pre-acceleration air amount a.

Figure 3:
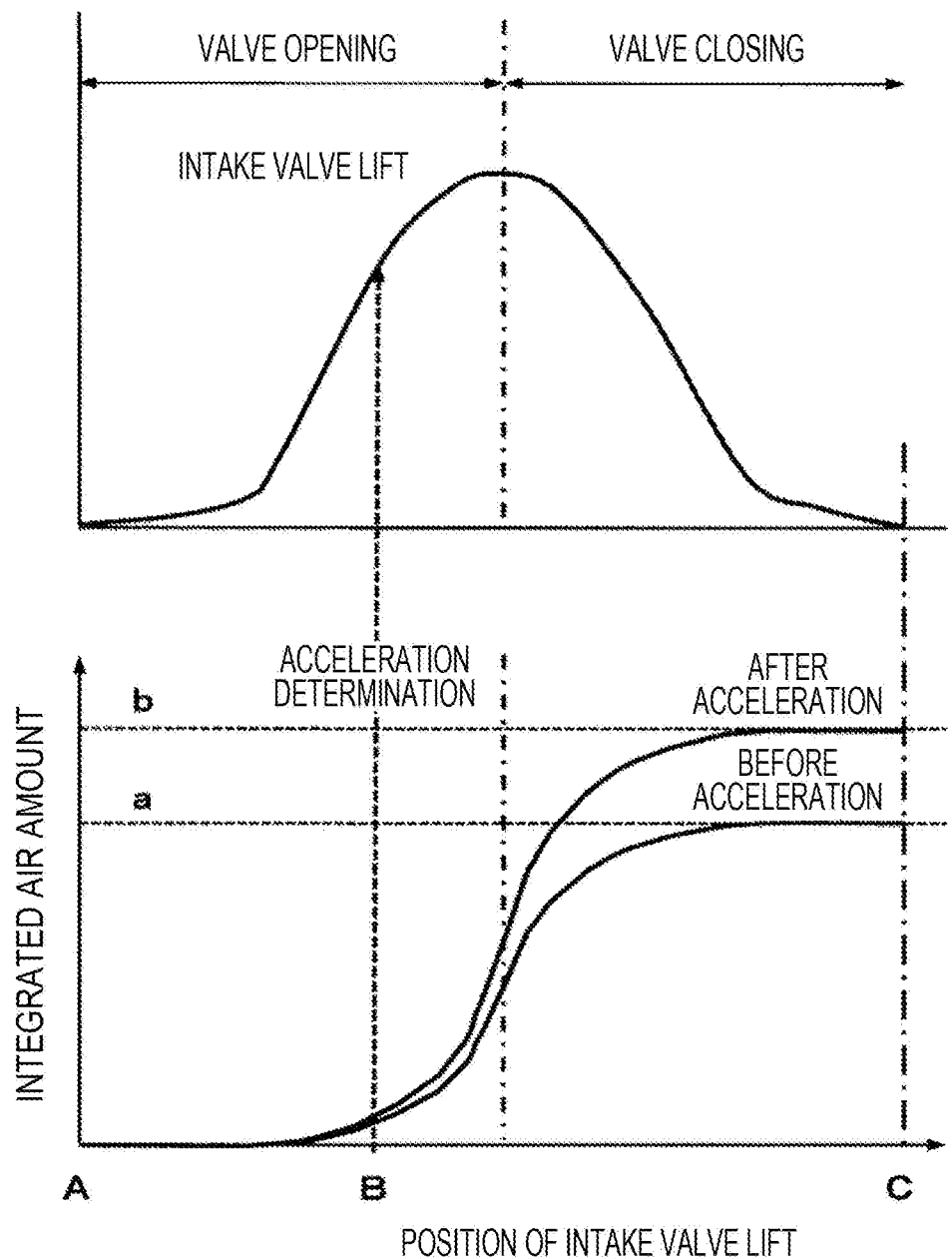
FIG. 3 is a chart indicating an intake valve lift amount at the timing of acceleration determination and an integrated air amount during an intake stroke.

In addition, when acceleration is determined at point B in FIG. 3 (when it is determined that acceleration of a vehicle is requested), the amount of intake air taken in the combustion chamber of the internal combustion engine increases after acceleration determination, the integrated amount of intake air taken in the combustion chamber of the internal combustion engine during one cycle has a behavior like the behavior after acceleration of FIG. 3, and the integrated air amount at point C at which the intake valve 3 closes becomes a post-acceleration air amount b. At this time, an increase in the intake air amount due to the acceleration request is a difference between the pre-acceleration air amount a and the post-acceleration air amount b. To accurately detect the increase in the air amount due to the acceleration request, it is effective to detect the intake air amount at point C (=post-acceleration air amount b) at which the intake valve 3 closes.

When the amount of intake air at the end of an intake stroke (point C) (=post-acceleration air amount b) is detected, and the fuel injection amount is calculated from the increase in the air amount (=b−a) due to the acceleration request, the fuel corresponding to the increase in the air amount can be supplied to the combustion chamber of the internal combustion engine, and deterioration of the driving performance and the starting performance due to fuel shortage can be suppressed. However, since the fuel injection start timing is a compression stroke, it is concerned that exhaust performance is deteriorated due to fuel adhesion to a piston crown surface and a wall surface of the combustion chamber of the internal combustion engine.

(Calculation of Intake Air Amount at the Time of Acceleration)

Figure 4:
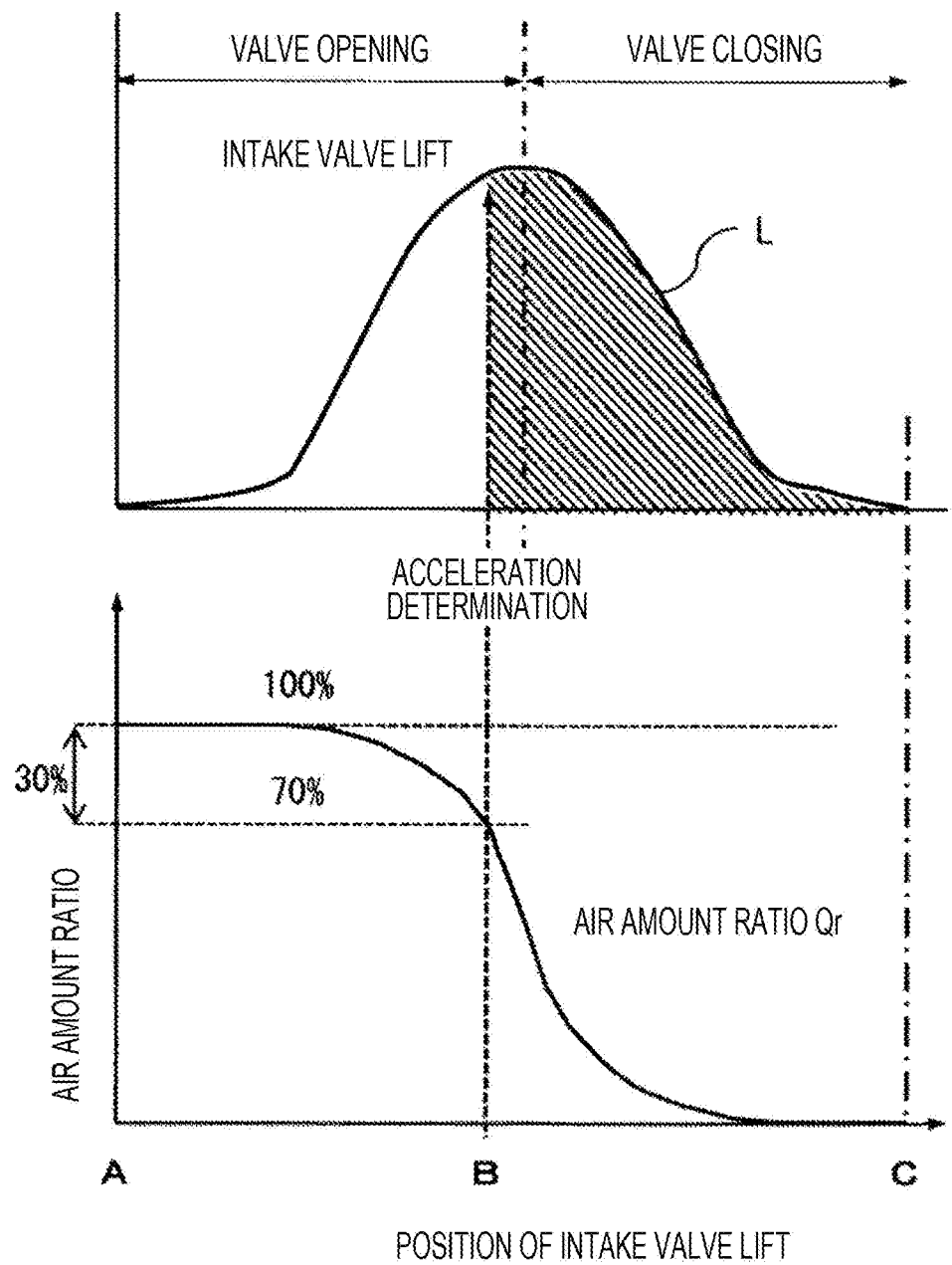
FIG. 4 is a chart indicating the relationship between an intake valve lift amount at the time of acceleration determination and an air amount ratio during an intake stroke.

In FIG. 4, a method of calculating the acceleration intake air amount Qad at the time of occurrence of an acceleration request, which is a solution to the problem raised in the comparative example, will be described. The acceleration intake air amount Qad means an increase amount associated with acceleration of the vehicle, of the amount of air taken in the combustion chamber of the internal combustion engine after acceleration of a vehicle is requested in one combustion cycle.

In the present embodiment, in the case of determining the increase in an air amount due to an acceleration request (when it is determined that a vehicle acceleration is requested), a fuel injection amount is calculated based on the amount of intake air taken in the combustion chamber of the internal combustion engine at the end of an intake stroke, and fuel injection during an intake stroke is immediately corrected.

In this control, the air amount ratio Qr obtained by integrating a lift amount of the intake valve 3 at predetermined time intervals is calculated, and the intake air amount is corrected with the calculated air amount ratio Qr. The air amount ratio Qr is a ratio of the amount of air taken in the combustion chamber of the internal combustion engine from the valve opening start timing (point A) of the intake valve to the valve closing completion timing (point C) and the amount of air taken in the combustion chamber of the internal combustion engine from the vehicle acceleration requested timing (point B) to the valve closing completion timing (point C). The valve opening start timing is the timing at which the intake valve 3 starts to open, and the valve closing completion timing is the timing at which the intake valve 3 completes valve closing.

Specifically, the intake air amount which is the basis of the fuel injection amount calculation is the intake air amount Qstd detected by the intake air flow meter 18 (AFM) at the start of the intake stroke and a value detected before point A at which the intake valve 3 starts to open. On the other hand, the air amount ratio Qr is 100% when the intake valve 3 starts to open at point A and is 0% at the end of vale closing which is point C.

In the example of FIG. 4, the air amount ratio Qr corresponds to a ratio of the integrated value (hatched portion in FIG. 4) of the lift amount L of the intake valve 3 from point B to point C with respect to the integrated value (time integral value) of the lift amount L of the intake valve 3 from point A to point C.

As illustrated in FIG. 4, when a predetermined acceleration request is generated at point B in the figure, and the air amount ratio Qr at that time is 70%, 70% of total intake air amount during an intake stroke is taken in from point B at which the acceleration request is generated to point C at which the valve 3 closes. On the other hand, from point A to point B, about 30% of the total intake air amount during the intake stroke is taken in the combustion chamber of the internal combustion engine.

Therefore, it is possible to calculate the acceleration intake air amount Qad by multiplying the difference between the intake air amount Qstd (point A), which is the basis of a fuel injection amount calculation, and the intake air amount Qacc (point B) at the time of occurrence of an acceleration request, by the air amount ratio Qr (correction coefficient). In the present embodiment, the intake air amount Qstd, which is the basis of the fuel injection amount calculation, is updated at point A to improve the accuracy of the acceleration intake air amount Qad.

As a result, since the intake air amount (acceleration intake air amount Qad) which is increased due to the acceleration request at the end of the intake stroke is calculated at the time of occurrence of the acceleration request, a fuel corresponding to the increase in the air amount Qad can be supplied in the combustion chamber of the internal combustion engine during the intake stroke to suppress deterioration of driving performance and starting performance due to fuel shortage and also prevent deterioration of exhaust performance by compression stroke injection.

Although the idea is the same even when a variable valve mechanism is used for the intake valve 3 and the exhaust valve 4, when valve overlap occurs in which a valve closing timing of the exhaust valve 4 and a valve opening timing of the intake valve 3 overlap, the intake air is blown through the exhaust pipe 11 due to overlap, and therefore it is necessary to calculate the intake air amount in consideration of the amount of air blown out.

In addition, in this control, the control method of multistage injection is also changed to achieve both suppression of deterioration of driving performance and starting performance at the time of occurrence of an acceleration request and prevention of exhaust performance deterioration due to compression stroke injection.

Figure 5:
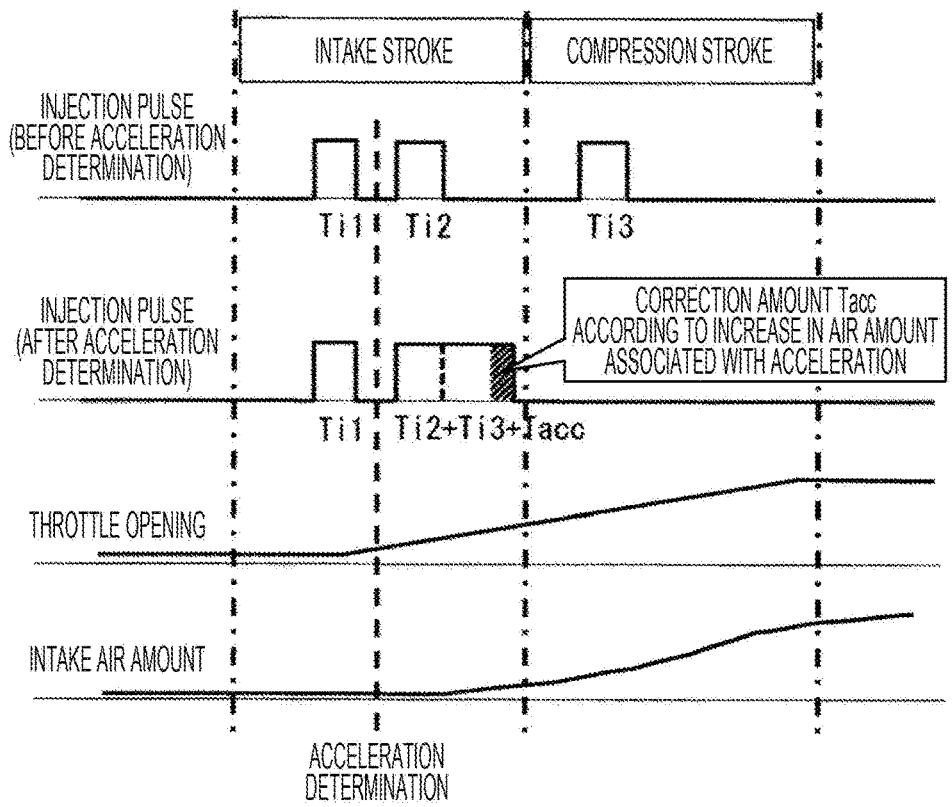
FIG. 5 is a time chart indicating a first multistage injection method at the time of acceleration determination.

(Multistage injection control) With respect to a method of changing multistage injection, the contents of change will be described with reference to the time charts of FIGS. 5 and 6. FIG. 5 assumes multistage injection control in which fuel injection is performed twice during an intake stroke and once during a compression stroke and indicates the case where acceleration is determined after the first fuel injection in the intake stroke.

When acceleration is determined by driver's accelerator operation, as described above, the acceleration intake air amount Qad is calculated by multiplying the difference between the intake air amount Qstd which is the basis of the fuel injection amount calculation and the intake air amount Qacc at the time of occurrence of the acceleration request by the air amount ratio Qr (correction coefficient). The fuel injection correction amount Tacc corresponding to the acceleration intake air amount Qad can be calculated from an engine speed and the acceleration intake air amount Qad, but it may be calculated using a map or the like stored in a storage medium.

When the correction amount Tacc calculated here is injected immediately after fuel injection (injection pulse width Ti3) during an compression stroke or injected combined with the fuel injection (injection pulse width Ti3) during the compression stroke, the injection period during the compression stroke is extended, and it is concerned that exhaust performance is deteriorated due to fuel adhesion to a piston crown surface or a combustion chamber wall surface of the internal combustion engine.

As a countermeasure, to prevent the fuel injection during the compression stroke when acceleration is determined, it is controlled such that, at the ignition start timing of the second fuel injection (injection pulse width Ti2) during the intake stroke after acceleration determination, the second fuel injection (injection pulse width Ti2) during the intake stroke and remaining fuel injection (injection pulse width Ti3) during the compression stroke are performed at once by adding the fuel injection correction amount Tacc corresponding to the increase in the intake air amount Qad due to the acceleration determination. Accordingly, it is possible to supply the fuel corresponding to the amount of intake air taken in the combustion chamber of the internal combustion engine during one cycle without excess or deficiency such that it is possible to ensure the driving performance and also suppress deterioration of the exhaust performance.

Figure 6:
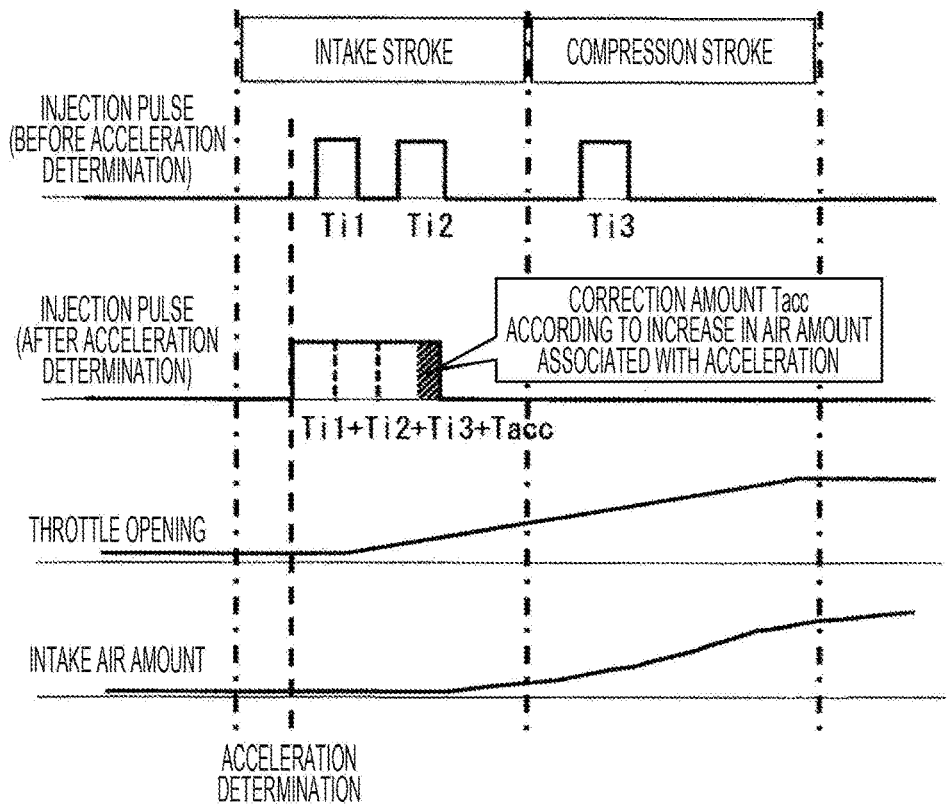
FIG. 6 is a time chart indicating a second multistage injection method at the time of acceleration determination.

In addition, FIG. 6 assumes multistage injection control in which fuel injection is performed twice during the intake stroke and once during the compression stroke and indicates the case where acceleration is determined before the first fuel injection during the intake stroke.

When acceleration is determined by driver's accelerator operation, the fuel injection correction amount Tacc corresponding to the increase in the intake air amount Qad due to acceleration determination is calculated similarly to the above case.

In the example of FIG. 6, to prevent the fuel injection (injection pulse width Ti3) during the compression stroke when acceleration is determined, it is controlled such that, immediately after the acceleration determination, the first fuel injection (injection pulse width Ti1) during the intake stroke, the second fuel injection (injection pulse width Ti2) during the intake stroke, and remaining fuel injection (injection pulse width Ti3) during the compression stroke are performed at once by adding the fuel injection correction amount Tacc corresponding to the increase in the intake air amount Qad due to the acceleration determination. In this case also, it is possible to supply the fuel corresponding to the amount of intake air taken in the combustion chamber of the internal combustion engine during one cycle without excess or deficiency such that it is possible to ensure the driving performance and also suppress deterioration of the exhaust performance.

Figure 7:
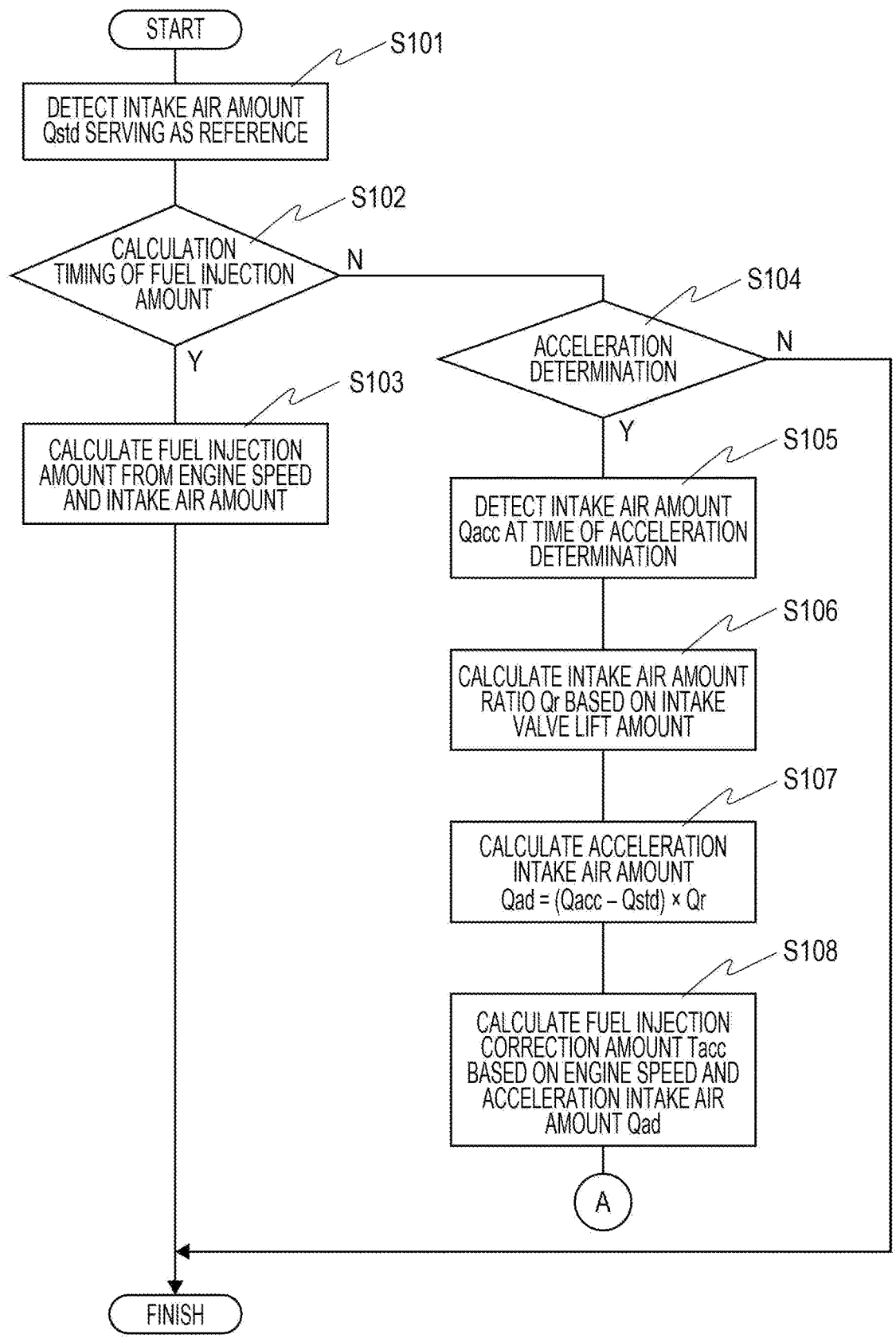
FIG. 7 is a flowchart indicating a method of calculating a fuel injection correction amount at the time of acceleration determination.

(Process flow) Next, a fuel injection control method at the time of acceleration determination will be described with reference to flowcharts of FIGS. 7, 8, and 9. The flowchart of FIG. 7 indicates the relationship between the calculation of the fuel injection amount and the fuel injection correction amount calculated at the time of acceleration determination. Each process of the flowchart is executed by the engine control unit 9.

When this routine is started, the intake air amount Qstd serving as a reference for calculating the fuel injection amount in step S101 is detected from the output of the intake air flow meter 18 (AFM).

Thereafter, in step S102, it is determined whether it is a timing for calculating the fuel injection amount.

If it is determined to be a timing for calculating the fuel injection amount in step S102 (step S102: YES), the process proceeds to step S103, in which the fuel injection amount is calculated based on the current engine speed and the intake air amount Qstd detected in step S101, and finishes.

On the other hand, if it is determined not to be a timing for calculating a fuel injection amount in step S102 (step S102: NO), it is determined in step S104 whether a predetermined acceleration determination is established. If it is determined in step S104 that a predetermined acceleration determination is established (step S104: YES), in step S105, the intake air amount Qacc at the time when the acceleration determination is established is detected from the output of the intake air flow meter 18 (AFM).

Thereafter, in step S106, the intake air amount ratio Qr is calculated based on the lift amount of the intake valve assuming that the valve opening start time of the intake valve 3 is 100%, and the valve closing end time is 0%. Here, the engine control unit 9 functions as a calculation unit that calculates the intake air amount ratio Qr based on the lift amount of the intake valve and stores the intake air amount ratio Qr in the RAM 105 (storage unit). Specifically, the engine control unit 9 (calculation unit) calculates the intake air amount ratio Qr based on the integrated value of the lift amount of the intake valve.

In the following step S107, from the intake air amount Qacc at the time of acceleration determination detected in step S105 and the intake air amount ratio Qr (temporarily stored in the RAM 105) calculated in step S106, the acceleration intake air amount Qad is calculated using the following equation (1). It should be noted that the previously calculated intake air amount ratio Qr may be stored in a storage medium, and the acceleration intake air amount Qad may be calculated using the value.

$$Qad = (Qacc - Qstd) \times Qr \qquad \text{[Mathematical Formula 1]}$$

Here, when acceleration of a vehicle is requested during the intake stroke in one combustion cycle, the engine control unit 9 functions as an estimation unit that estimates an increase (acceleration intake air amount Qad) in the amount of air taken in the combustion chamber of the internal combustion engine associated with acceleration of a vehicle after the acceleration of the vehicle is requested in the one combustion cycle based on the lift amount of the intake valve. Thus, before the closing completion timing of the intake valve 3, the increase in the amount of air taken in the combustion chamber of the internal combustion engine associated with acceleration of a vehicle can be calculated after acceleration of a vehicle is requested in one combustion cycle.

Thereafter, in step S108, the fuel injection correction amount Tacc is calculated based on the acceleration intake air amount Qad and the engine speed, calculated in step S107. The engine control unit 9 functions as a control unit that controls the fuel injection device so as to increase the fuel injection amount in one combustion cycle according to the acceleration intake air amount Qad.

The injection method of the fuel injection correction amount Tacc calculated in step S108 will be described in detail with reference to the flowcharts of FIGS. 8 and 9. On the other hand, if it is determined in step S104 that the predetermined acceleration determination is not established (step S104: NO), no processing is performed, and the process finishes.

Figure 8:
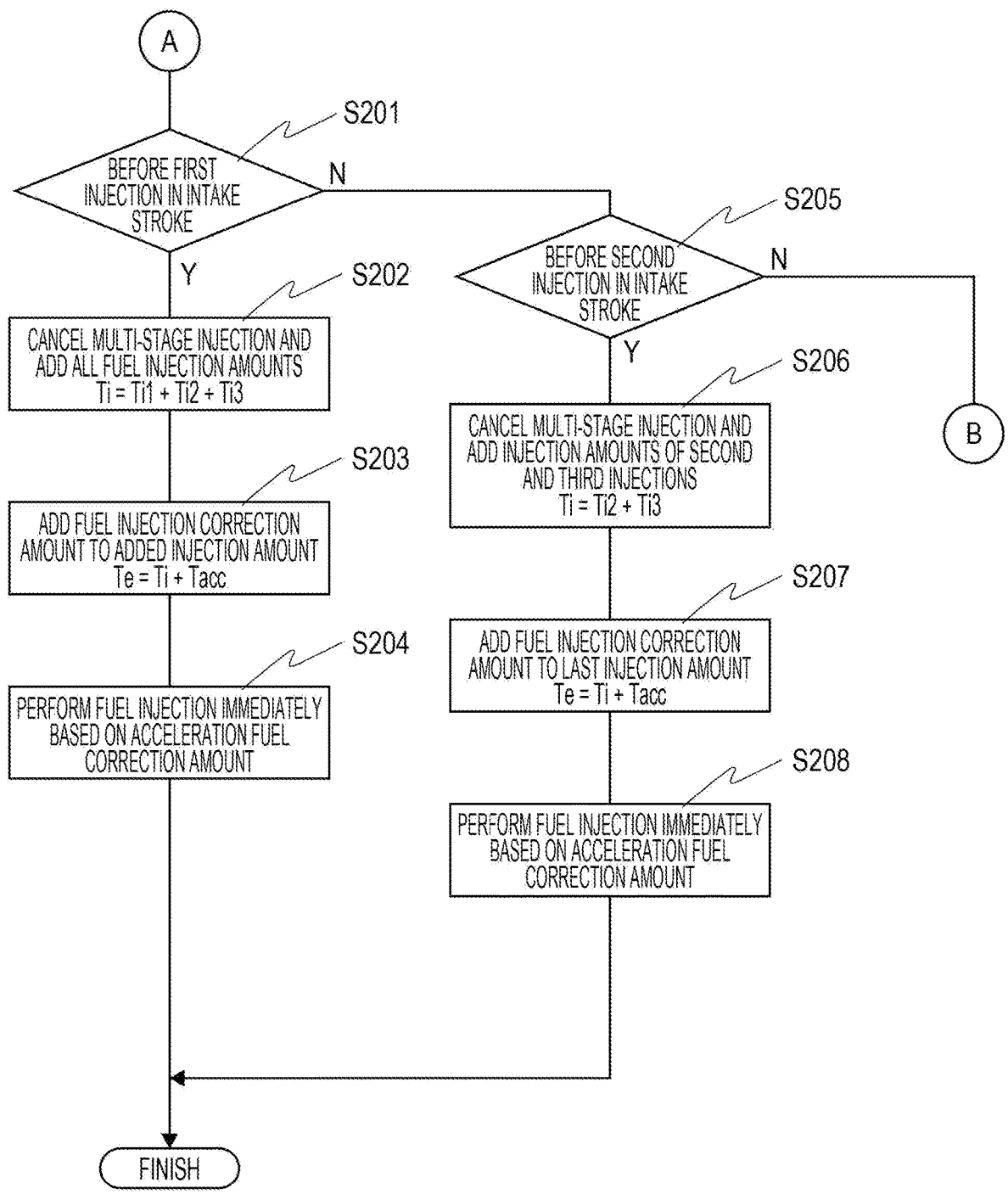
FIG. 8 is a flowchart indicating a fuel injection control method of a fuel injection correction amount.
Figure 9:
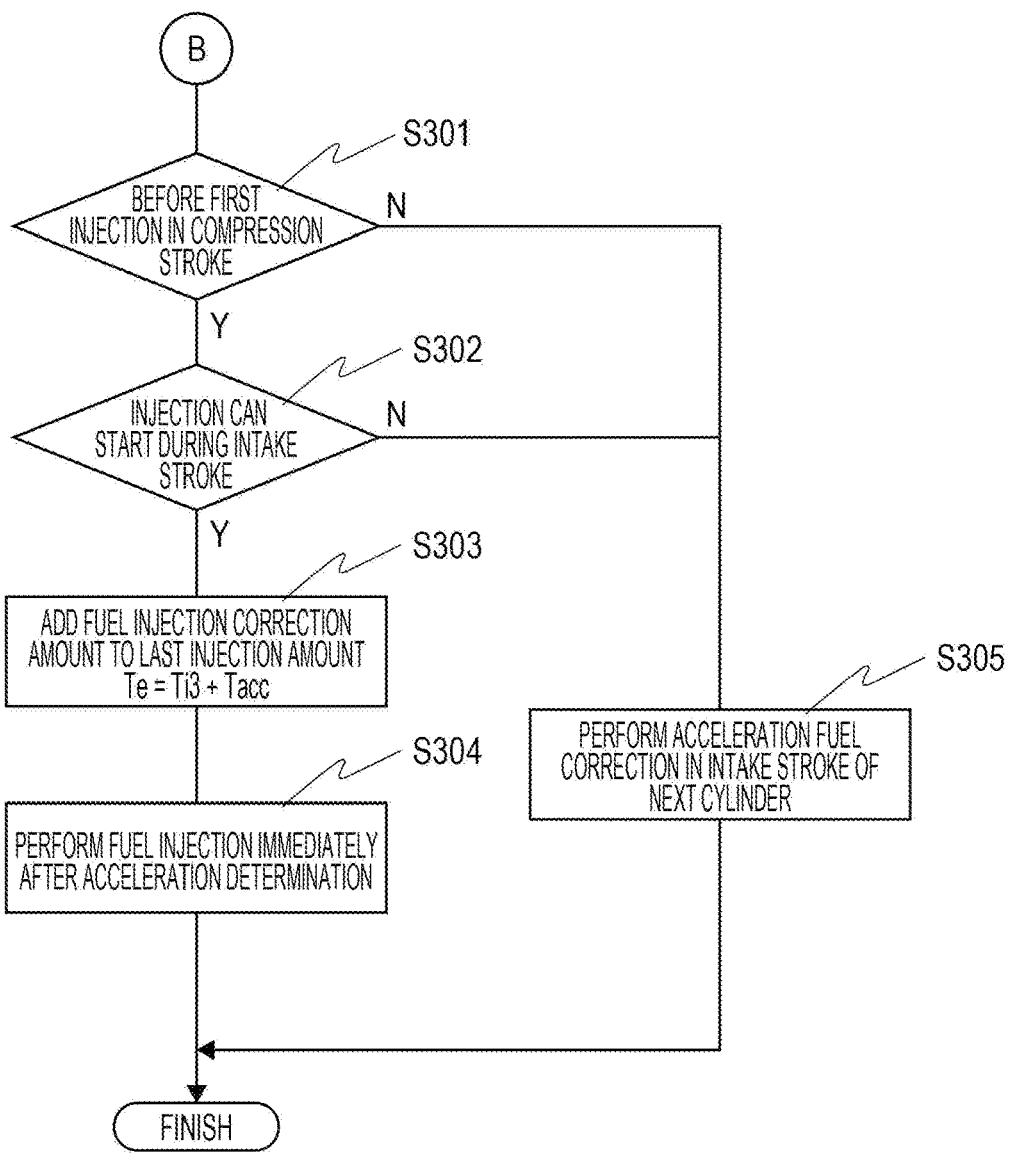
FIG. 9 is a flowchart indicating a fuel injection control method of a fuel injection correction amount.

FIGS. 8 and 9 are flow charts indicating the fuel injection control method of the fuel injection correction amount Tacc calculated in step S108, and the method starts from A in FIG. 8. In this flowchart, the case of multistage injection control in which fuel injection is performed twice during an intake stroke and once during a compression stroke will be exemplified, but setting of the number of injection times, the injection timing, and the like is not limited to the embodiment.

First, in step S201, it is determined whether the calculation timing of the fuel injection correction amount Tacc calculated in step S108 is before the first injection in the intake stroke. If it is determined in step S201 that the calculation timing is before the first injection during the intake stroke (step S201: YES), the process proceeds to step S202, in which the set multistage injection control is canceled, all of the fuel injection amounts set during one cycle are added, and the added injection amount Ti is calculated, as expressed by the following equation (2). Ti, Ti1 to Ti3 correspond to an injection pulse width indicating a period during which fuel is injected from the fuel injection valve 5.

$$Ti = Ti1 + Ti2 + Ti3 \qquad \text{[Mathematical Formula 2]}$$

Thereafter, in step S203, the fuel injection correction amount Tacc calculated in step S108 is added to the added injection amount Ti calculated in step S202 as expressed by the following equation (3), to calculate the acceleration fuel correction amount Te.

$$Te = Ti + Tacc \qquad \text{[Mathematical Formula 3]}$$

In the following step S204, fuel injection is immediately executed based on the acceleration fuel correction amount Te obtained in step S203, and the process is finished. On the other hand, if it is determined in step S201 that the calculation timing of the fuel injection correction amount Tacc is not before the first injection during the intake stroke (step S201: NO), the process proceeds to step S205, and it is determined whether the calculation timing of the fuel injection correction amount Tacc calculated in step S108 is before the second injection during the intake stroke. If it is determined in step S205 that the calculation timing is before the second injection in the intake stroke (step S205: YES), the process proceeds to step S206, in which the set multistage injection control is canceled, all of the remaining fuel injection amounts set during one cycle are added, and the added injection amount Ti is calculated, as expressed by the following equation (4).

$$Ti=Ti2+Ti3 \qquad \text{[Mathematical Formula 4]}$$

In other words, the engine control unit 9 (control unit) performs first control to cause the fuel injection valve 5 (fuel injection device) to perform fuel injection for a set number of times in one combustion cycle according to an operation state of the internal combustion engine (an engine speed, the temperature of a cooling water, the temperature of an engine oil). If acceleration of a vehicle is requested in an intake stroke during the first control, the engine control unit 9 cancels the first control and performs the second control to cause the fuel injection valve 5 to perform fuel injection once after the vehicle acceleration is requested in one combustion cycle.

Thereafter, in step S207, by adding the fuel injection correction amount Tacc calculated in step S108 to the added injection amount Ti calculated in step S206 as expressed by the following equation (3), the acceleration fuel correction amount Te is calculated. In the following step S208, fuel injection is immediately executed based on the acceleration fuel correction amount Te obtained in step S207, and the process is finished. On the other hand, if it is determined in step S205 that the calculation timing of the fuel injection correction amount Tacc is not before the second injection in the intake stroke (step S205: NO), the process proceeds to B and moves to the flowchart of FIG. 9.

FIG. 9 is a flowchart when the calculation timing of the fuel injection correction amount Tacc is determined not to be before the second injection during the intake stroke in step S205, and the flowchart starts from B of FIG. 9.

First, in step S301, it is determined whether the calculation timing of the fuel injection correction amount Tacc calculated in step S108 is before the first injection in the compression stroke. If it is determined in step S301 that the calculation timing is before the first injection in the compression stroke (step S301: YES), the process proceeds to step S302 to determine whether fuel injection can be started during the intake stroke.

For example, the engine control unit 9 may determine that fuel injection can be started during the intake stroke when the determination timing in step S302 is a predetermined time before the valve closing completion timing.

If it is determined in step S302 that fuel injection can be started during the intake stroke (step S302: YES), the process proceeds to step S303 to calculate the acceleration fuel correction amount Te by adding the fuel injection correction amount Tacc calculated in step S108 to the fuel injection amount Ti3 in the first injection in the compression stroke as expressed by the following equation (5).

$$Te=Ti3+Tacc \qquad \text{[Mathematical Formula 5]}$$

In the following step S304, the fuel injection is immediately performed based on the acceleration fuel correction amount Te obtained in step S303, and the process is finished. On the other hand, if it is determined in step S301 that the calculation timing of the fuel injection correction amount Tacc is not before the first injection in the compression stroke (step S301: NO), the process proceeds to step S305 to determine to perform correction in the intake stroke injection of the next cylinder without performing acceleration fuel correction during the compression stroke, and the process is finished.

In other words, the internal combustion engine 1 has at least a first cylinder and a second cylinder to be ignited next to the first cylinder, and the engine control unit 9 (control section) determines whether or not the last fuel injection in one combustion cycle can be started during an intake stroke for the first cylinder. If the last fuel injection in one combustion cycle cannot be started during the intake stroke for the first cylinder, the fuel injection valve 5 (fuel injection device) is controlled so as to increase the fuel injection period of the last fuel injection in one combustion cycle for the second cylinder in accordance with the acceleration intake air amount Qad estimated for the first cylinder.

Even when it is determined in step S302 that fuel injection cannot be started during the intake stroke (step S302: NO), the process proceeds to step S305, in which it is determined to perform acceleration fuel correction in the intake stroke injection for the next cylinder without performing the correction during the compression stroke, and the process is finished.

As described above, according to the present embodiment, when acceleration of a vehicle is requested during an intake stroke, it is possible to suppress deterioration of exhaust performance while ensuring driving performance That is, in the configuration of the present embodiment, when a predetermined acceleration request occurs, according to the intake air amount before the acceleration request, the intake air amount at the time of occurrence of the acceleration request, and valve operation of the intake valve, an acceleration intake air amount is calculated which increases during one combustion cycle in association with the acceleration request, and a fuel injection amount can be immediately corrected based on the acceleration intake air amount. Therefore, fuel shortage due to the increase in the intake air amount during an intake stroke can be solved, and driving performance such as starting and accelerating can be improved.

In addition, since the fuel injection amount is corrected immediately upon occurrence of the acceleration request, fuel injection within the intake stroke becomes possible, fuel injection is not performed in the compression stroke, fuel adhesion to a piston wall surface and a combustion chamber wall surface is avoided, and deterioration of exhaust performance can be suppressed.

(Variation)

Figure 10:
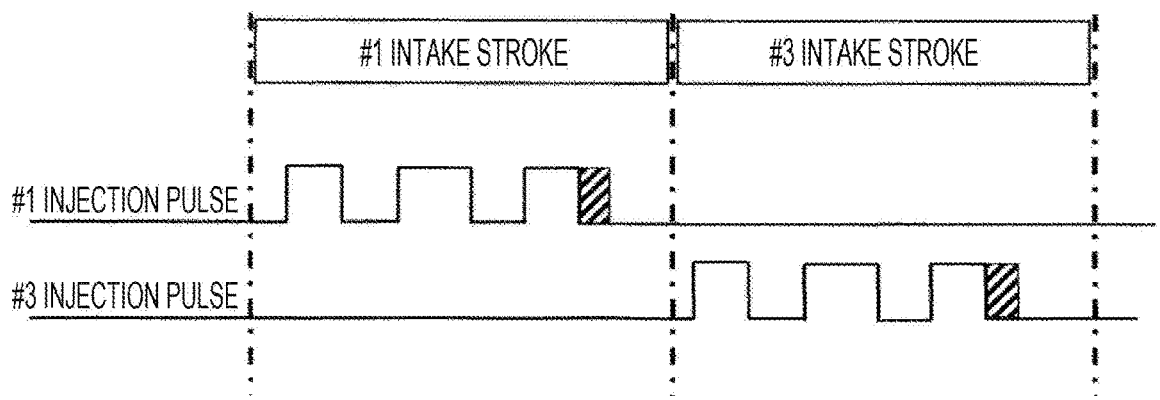
FIG. 10 is a time chart indicating a third multistage injection method at the time of acceleration determination.

FIG. 10 is a diagram indicating an example of multistage injection in which fuel injection is performed three times in the intake stroke. The engine control unit (control unit) executes control to cause the fuel injection valve 5 (fuel injection device) to perform fuel injection three times (set number of times) in one combustion cycle according to the operating state of the internal combustion engine.

When acceleration of a vehicle is requested during an intake stroke of one combustion cycle, the engine control unit 9 controls the fuel injection valve 5 (fuel injection device) so as to increase a fuel injection period of the last fuel injection in one combustion cycle according to the acceleration intake air amount Qad.

In the present variation, since the multistage injection is performed only in the intake stroke, it is not necessary to cancel multistage injection control and perform control in which the fuel injection valve 5 performs fuel injection once after the acceleration of a vehicle is requested in one duel combustion cycle. Thereby, it is possible to obtain the effect of multistage injection (for example, suppression of particulate matter).

In the present variation, the engine control unit 9 (control unit) increases the fuel injection period of the last fuel injection in one combustion cycle according to the acceleration intake air amount Qad, but a predetermined injection interval can be secured, and if the fuel injection is in time, the fuel injection period of either the first or the second fuel injection may be increased.

Further, the engine control unit 9 determines whether or not the last fuel injection in one combustion cycle can be started during the intake stroke for the first cylinder (cylinder corresponding to #1 in FIG. 10), and when the last fuel injection in the one combustion cycle cannot be started during the intake stroke for the first cylinder, according to the acceleration intake air amount Qad estimated for the first cylinder, the fuel injection valve (fuel injection device) may be controlled so as to increase the fuel injection period in one combustion cycle for the second cylinder (cylinder corresponding to #3 in FIG. 10).

The present invention is not limited to the above-described embodiments and includes various variations. For example, the above-described embodiments describe the present invention in detail for clarification, and every configuration described above may not be necessarily included. Further, a configuration of each embodiment can be partially replaced to a configuration of the other embodiment. Furthermore, a configuration of each embodiment can be added to the configuration of the other embodiment. Further, a part of a configuration of each embodiment can be added to, deleted from, and replaced from the other configuration.

Further, each of the above-described configurations, functions, and the like may be realized by hardware, for example, by designing a part of or all of them by using an integrated circuit. Further, each of the configurations and the functions may be realized by software by a processor interpreting and performing a program for realizing each function. Information such as a program, a table, and a file for realizing each function can be stored in a recording device such as a memory, a hard disc, and a solid state drive (SSD) or a recording medium such as an IC card, an SD card, and DVD.

The embodiments of the present invention may be in the following aspects.

(1) In a device for controlling a fuel injection device which directly performs fuel injection for a cylinder of an internal combustion engine, a control unit is provided which controls the fuel injection device so as to perform fuel injection for a set number of times in one cycle. When it is determined to accelerate during an intake stroke in the one cycle, the control unit controls so as to increase the injection width of subsequent fuel injection based on the amount of intake air during the intake stroke.

(2) In a device for controlling a fuel injection device which directly performs fuel injection for a cylinder of an internal combustion engine, a control unit is provided which controls the fuel injection device so as to perform fuel injection for a set number of times in one cycle. When it is determined to accelerate during an intake stroke in the one cycle, the control unit controls so as to increase the injection width of subsequent fuel injection according to operation of an intake valve that opens and closes an intake side flow path of the internal combustion engine at that time.

(3) In the device for controlling the fuel injection device according to (1), when it is determined to accelerate during the intake stroke in the one cycle, the control unit controls so as to increase the injection width of the last fuel injection in the one cycle based on the amount of intake air during the intake stroke.

(4) In the device for controlling the fuel injection device according to (2), when it is determined to accelerate during the intake stroke in the one cycle, the control unit controls so as to increase the injection width of the last fuel injection in the one cycle according to operation of the intake valve that opens and closes the intake side flow path of the internal combustion engine at that time (5) In the device for controlling the fuel injection device according to (1), when it is determined to accelerate during the intake stroke in the one cycle, the control unit controls such that the injection width of the last fuel injection during the intake stroke is increased in a range before starting a compression stroke subsequent to the intake stroke, based on the amount of intake air during the intake stroke.

(6) In the device for controlling the fuel injection device according to (2), when it is determined to accelerate during the intake stroke in the one cycle, the control unit controls such that the injection width of the last fuel injection during the intake stroke is increased in a range before starting a compression stroke subsequent to the intake stroke, according to operation of the intake valve that opens and closes the intake side flow path of the internal combustion engine at that time.

(7) In the device for controlling the fuel injection device according to (2), when the amount of air taken in the internal combustion engine is the same in the case where the acceleration is determined, the control unit controls such that the injection width of the last fuel injection during the intake stroke is increased in a range before starting a compression stroke subsequent to the intake stroke according to the operation of the intake valve that opens and closes the intake side flow path of the internal combustion engine at that time.

(8) In the device for controlling the fuel injection device according to (1), when the operation of the intake valve that opens and closes the intake side flow path of the internal combustion engine is the same in the case where the acceleration is determined, the control unit controls such that the injection width of the last fuel injection during the intake stroke is increased in a range before starting a compression stroke subsequent to the intake stroke as the amount of air taken in the internal combustion engine at that time increases.

(9) In the device for controlling the fuel injection device according to (1) or (2), when the amount of air taken in the internal combustion engine is the same, and the operation of the intake valve that opens and closes the intake side flow path of the internal combustion engine is the same in the case where the acceleration is determined, the control unit controls such that the injection width of the last fuel injection during the intake stroke is increased in a range before starting a compression stroke subsequent to the intake stroke as the acceleration determination timing becomes early in the intake stroke.

(10) In the device for controlling the fuel injection device according to (1) or (2), when the acceleration is determined, the control unit controls the injection width of the last fuel injection in the intake stroke based on the amount of air taken in the internal combustion engine at the acceleration determination and the total intake air amount to the internal combustion engine during the intake stroke that is required from the operation of the intake valve that opens and closes the intake side flow path of the internal combustion engine.

(11) In a device for controlling a fuel injection device for directly performing fuel injection for a cylinder of an internal combustion engine, a control unit is provided which controls the fuel injection device so as to perform fuel injection for a set number of times in one cycle. The control unit controls the fuel injection device such that a fuel injection amount becomes larger than the total fuel injection amount in the case of performing fuel injection for a set number of times. When the control unit controls the fuel injection device so as to perform fuel injection for the set number of times in a first cycle and when acceleration is determined in a second cycle subsequent to the first cycle, by performing subsequent fuel injection in the second cycle at a long injection pulse with respect to fuel injection of the same timing in the first cycle, the control unit controls such that the total fuel injection amount in the second cycle becomes larger than the total fuel injection amount in the first cycle.

(12) In the device for controlling the fuel injection device according to (11), the control unit controls such that the fuel injection is performed in the second cycle in the number of times smaller than the set number of times in the first cycle when acceleration is determined in the second cycle.

(13) In the device for controlling the fuel injection device according to (11), the control unit sends the long injection pulse to the fuel injection device so as to be within the intake stroke of the second cycle.

(14) In the device for controlling the fuel injection device according to (11), the control unit controls such that the length of the long injection pulse is shortened when the acceleration is determined in the later injection than the first stage of the second cycle in comparison with the case where the acceleration is determined in the injection in the first stage of the second cycle.

According to the above embodiments (1) to (14), at the time of multistage injection control, the air amount that increases during the intake stroke associated with acceleration or the like is accurately calculated, and the fuel injection amount is calculated based on the calculated intake air amount. As a result, it is possible to ensure the driving performance and also suppress deterioration of the exhaust performance.

REFERENCE SIGNS LIST 1 internal combustion engine
2 piston
3 intake valve
4 exhaust valve
5 fuel injection valve
6 ignition plug
7 ignition coil
8 knock sensor
9 ECU (engine control unit)
10 intake pipe
11 exhaust pipe
12 three-way catalyst
13 air fuel ratio sensor
14 intake manifold
15 crank angle sensor
16 signal plate
17 throttle valve
18 intake air flow meter (AFM)
19 combustion chamber
20 accelerator opening sensor

The invention claimed is:

1. A device for controlling a fuel injection device, comprising:
an estimation unit configured to estimate, when acceleration of a vehicle is requested during an intake stroke in one combustion cycle, based on a lift amount of an intake valve, an increase in the amount of air taken in a combustion chamber of an internal combustion engine associated with the acceleration of the vehicle after the acceleration of the vehicle is requested in the one combustion cycle;
a control unit configured to control the fuel injection device so as to increase a fuel injection amount in the one combustion cycle according to the increase in the air amount estimated in the estimation unit; and
a storage unit configured to store an air amount ratio indicating a ratio of the amount of air taken in the combustion chamber of the internal combustion engine from a timing at which the acceleration of the vehicle is requested to a valve closing completion timing of the intake valve with respect to the amount of air taken in the combustion chamber of the internal combustion engine from a valve opening start timing of the intake valve to the valve closing completion timing, wherein
the estimate unit estimates an increase in the amount of air taken in the combustion chamber of the internal combustion engine associated with the acceleration of the vehicle after the acceleration of the vehicle is requested, based on a difference between an intake air amount measured at a timing before the valve opening start timing and an intake air amount measured at a timing at which the acceleration of the vehicle is requested, and the air amount ratio.

2. The device for controlling the fuel injection device according to claim 1, comprising:
a calculation unit configured to calculate the air amount ratio based on a lift amount of the intake valve and stores the air amount ratio in the storage unit.

3. The device for controlling the fuel injection device according to claim 2,
wherein the calculation unit calculates the air amount ratio based on an integrated value of the lift amount of the intake valve.

4. The device for controlling the fuel injection device according to claim 1,
wherein the control unit performs a first control to cause the fuel injection device to perform fuel injection for a set number of times in one combustion cycle according to an operating state of the internal combustion engine, and
the control unit cancels the first control when acceleration of a vehicle is requested in an intake stroke during the first control and performs a second control to cause the fuel injection device to perform fuel injection once after the acceleration of the vehicle is requested in the one combustion cycle.

5. The device for controlling the fuel injection device according to claim 1,
wherein the control unit performs control to cause the fuel injection device to perform fuel injection for a set number of times in one combustion cycle according to an operating state of the internal combustion engine, and
the control unit controls the fuel injection device so as to increase a fuel injection period of any one of the one combustion cycles according to an increase in the air amount estimated in the estimation unit.

6. The device for controlling the fuel injection device according to claim 5,
wherein the control unit controls the fuel injection device so as to increase the fuel injection period of the last fuel injection in the one combustion cycle according to the increase in the air amount estimated in the estimation unit.

7. The device for controlling the fuel injection device according to claim 6,
wherein the internal combustion engine at least includes a first cylinder and a second cylinder to be ignited next to the first cylinder,
the control unit determines whether or not the last fuel injection in one combustion cycle can be started during an intake stroke for the first cylinder, and
when the last fuel injection of the one combustion cycle cannot be started during the intake stroke for the first cylinder,
the control unit controls the fuel injection device so as to increase a fuel injection period in the one combustion cycle for the second cylinder, according to an increase in the air amount for the first cylinder estimated by the estimation unit.

\* \* \* \* \*